US012006198B2

(12) United States Patent
Owens

(10) Patent No.: US 12,006,198 B2
(45) Date of Patent: Jun. 11, 2024

(54) COOLER PANEL LIFTING ASSEMBLY

(71) Applicant: Jeffrey L. Owens, Prosperity, SC (US)

(72) Inventor: Jeffrey L. Owens, Prosperity, SC (US)

( * ) Notice: Subject to any disclaimer, the term of this patent is extended or adjusted under 35 U.S.C. 154(b) by 660 days.

(21) Appl. No.: 17/267,186

(22) PCT Filed: Aug. 19, 2019

(86) PCT No.: PCT/US2019/047044
§ 371 (c)(1),
(2) Date: Feb. 9, 2021

(87) PCT Pub. No.: WO2020/041186
PCT Pub. Date: Feb. 27, 2020

(65) Prior Publication Data

US 2021/0300743 A1 Sep. 30, 2021

Related U.S. Application Data

(60) Provisional application No. 62/721,212, filed on Aug. 22, 2018.

(51) Int. Cl.
*B66F 9/18* (2006.01)
*B66F 9/16* (2006.01)

(52) U.S. Cl.
CPC . *B66F 9/18* (2013.01); *B66F 9/16* (2013.01)

(58) Field of Classification Search
CPC .................................... B66F 9/16; B66F 9/18
See application file for complete search history.

(56) References Cited

U.S. PATENT DOCUMENTS 3,643,935 A * 2/1972 Bell .................... E04F 21/0023 269/84
5,476,300 A * 12/1995 Dodge ...................... B66C 1/54 294/93
5,548,967 A * 8/1996 Ghiraldi .................. F25D 17/02 62/99
2006/0182582 A1* 8/2006 Sharpton ................. B66F 9/065 414/542
2007/0289888 A1* 12/2007 Stangel ...................... B66F 9/12 206/430
2010/0236173 A1* 9/2010 Pacha ........................ B32B 3/30 52/592.1
2016/0160511 A1* 6/2016 Giattina .................. E04F 21/18 414/816
2018/0209137 A1* 7/2018 Carlyon .................. E04C 2/292

FOREIGN PATENT DOCUMENTS

JP 2009127338 6/2009
JP 2009127338 A * 6/2009

* cited by examiner

*Primary Examiner* — Saul Rodriguez
*Assistant Examiner* — Brendan P Tighe

(57) ABSTRACT

A cooler panel lifting assembly includes a jig having substantially vertically oriented bars spaced apart from each other with an attachment device for attaching the jig to a lifting mechanism; and a roller for rolling the jig loaded with a plurality of panels in a direction of the lifting mechanism.

16 Claims, 11 Drawing Sheets

COOLER PANEL LIFTING ASSEMBLY

CROSS-REFERENCE TO RELATED APPLICATIONS

This utility patent application claims benefit of U.S. Provisional Patent Application Ser. No. 62/721,212, filed in the United States Patent and Trademark Office on Aug. 22, 2018, which is incorporated herein by reference in its entirety.

BACKGROUND OF THE DISCLOSURE

Warehouse stores such as COSTCO® and SAM'S CLUB® are found in many countries. These warehouse or "box" stores are known for selling consumer electronics, clothing, and food items in bulk, so the stores tend to be extremely large to accommodate large quantities and bulk packages. Correspondingly large refrigerated sections are provided for food items that need to be stored at cooler temperatures. Insulated panels are used to separate the stores' refrigerated sections from the non-refrigerated areas. The refrigerated sections, like the stores as a whole, may be twenty to thirty feet in height from floor to ceiling. Therefore, the panels used to form these very high walls are each usually four to five feet in height and width. Installation of dozens of these large, heavy panels is time consuming and can be dangerous as the panels are maneuvered and secured into place, one on top of the other and side by side. Typically, such installation requires about twenty minutes for a crew to install just one panel, which becomes more hazardous and time-consuming with each higher panel.

What is needed in the consumer warehouse industry is a system for installing multiple cooler panels in less time with less risk than it takes to install a single panel using conventional installation methods.

BRIEF SUMMARY OF THE DISCLOSURE

The present disclosure is directed in general to an assembly for use with a forklift for safely and simultaneously installing multiple cooler panels to form refrigerated sections in large warehouse and store spaces. The exemplary assemblies according to the present disclosure may be used for more efficient, safer construction of warehouses, buildings, and other edifices.

One cooler panel lifting and installation assembly according to the present disclosure includes a frame or jig having substantially vertically oriented bars spaced apart from each other; attachment means for attaching the jig to a lifting mechanism; and a roller for rolling the jig loaded with a plurality of panels in a direction of the lifting mechanism. The bars may be about four feet to about twenty-five feet in length and spaced apart from between about two feet to about twenty feet. The bars may be telescoping bars to adjust their length, and multiple jigs can be added together vertically and/or horizontally to accommodate oversized panel sections. Still further, substantially horizontal bars may be adjustably attached to the vertical bars to accommodate a variety of panel loads.

In this aspect, the attachment means may be an aperture in the jig, or a ring attached to the jig, and a bar attached to the lifting mechanism in which the bar may include a clip hooked in the aperture or to the ring, wherein, when the jig is rolled in a direction of the lifting mechanism, the clip and the ring swivel relative to each other. Additionally, or alternatively, the attachment means may be a swivel mechanism having mobility in multiple axes that extends, for instance, from the bar such that when a panel section is nearly in place, a worker can simply adjust the section into its final position using the swivel.

Also, in this example the lifting mechanism may be a forklift, and the assembly may also include a substantially horizontally oriented frame configured to stabilize the jig and the panels to prevent torsion or twisting as the lifting mechanism elevates the panels.

In another embodiment, a method of loading, elevating and installing a section of cooler panels may include providing a jig having a plurality of substantially vertically oriented bars spaced apart from each other and a substantially horizontally oriented frame configured to stabilize a load of panels; attaching a swivable bar to the jig and to a lifting mechanism; loading a plurality of cooler panels on the jig; rolling the jig loaded with the plurality of panels in a direction of the lifting mechanism; raising the panels via the jig into position on a cooler wall; and installing the panels as a unitary panel section in the cooler wall.

Other embodiments include the foregoing and other elements and steps described herein, and their equivalents, in various combinations.

Additional objects and advantages of the present subject matter are set forth in, or will be apparent to, those of ordinary skill in the art from the description herein. Also, it should be further appreciated that modifications and variations to the specifically illustrated, referenced, and discussed features, processes, and elements hereof may be practiced in various embodiments and uses of the disclosure without departing from the spirit and scope of the subject matter. Variations may include, but are not limited to, substitution of equivalent means, features, or steps for those illustrated, referenced, or discussed, and the functional, operational, or positional reversal of various parts, features, steps, or the like. Those of ordinary skill in the art will better appreciate the features and aspects of the various embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION OF THE DISCLOSURE

Figure 1:
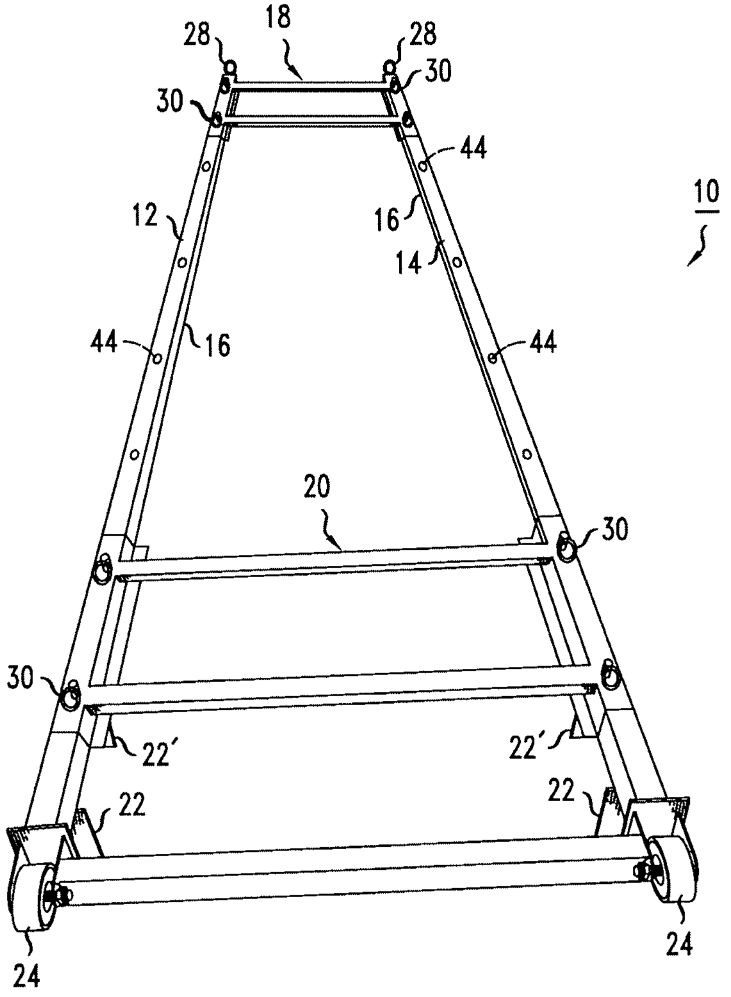
FIG. 1 is a perspective view of an embodiment of a panel installation assembly according to an aspect of the disclosure.

Detailed reference will now be made to the drawings in which examples embodying the present subject matter are shown. The detailed description uses numerical and letter designations to refer to features of the drawings. The drawings and detailed description provide a full and written description of the present subject matter, and of the manner and process of making and using various exemplary embodiments, so as to enable one skilled in the pertinent art to make and use them, as well as the best mode of carrying out the exemplary embodiments. The drawings are not necessarily to scale, and some features may be exaggerated to show details of particular components. Thus, the examples set forth in the drawings and detailed descriptions are provided by way of explanation only and are not meant as limitations of the disclosure. The present subject matter thus includes any modifications and variations of the following examples as come within the scope of the appended claims and their equivalents.

Turning now to FIG. 1, a cooler panel installation assembly, also referred to herein as an attachment device, cradle, or jig according to an aspect of the disclosure, is designated in general by the number 10. The assembly 10 broadly includes a left vertical strut or bar 12, a right vertical strut or bar 14, each having cushion strips or pads 16, and adjustable horizontal frames 18, 20 attached thereto. The exemplary bars 12, 14 may be made from metal such as steel or reinforced aluminum or other durable but preferably light-weight material such as plastic, high-density polyethylene (HDPE) and the like. The bars 12, 14 and therefore the assembly 10 itself may be approximately twenty feet (20') in length and may be spaced about three feet (3') apart from each other with the horizontal frames 18, 20 being spaced approximately two feet (2') from either end of the bars 12, 14. However, those skilled in the art will understand that the bars 12, 14 may be longer or shorter than twenty feet (20') to accommodate various projects. Likewise, the spacing between the bars 12, 14 and the placement of the horizontal frames 18, 20 may be adjusted as needed, as described in further detail below. In one aspect, the bars 12, 14 may be telescoping in order to shorten or lengthen to a desired length.

FIG. 1 also shows that each of the bars 12, 14 may have padded ledges or cradles 22 for receiving workpieces, such as cooler panels. Similarly, the frame 20 (and/or frame 18) may include cradles 22' to carry custom loads at different points along the assembly 10 as explained below. The padding 16, along with the padded cradles 22, 22' serve to protect workpieces from damage from contact with the bars 12, 14 during loading procedures. Further, each bar 12, 14 may have apertures 44 into which Cotter keys, bolts, or pins 30 of the frames 18, 20 may be moved to adjust the position of the frames 18, 20, which may be necessary to accommodate different panel sizes. Moreover, the exemplary cradles 22, 22' may be wider or extend further than the examples shown to accommodate panels arranged vertically on the assembly 10, thicker panels, et cetera.

As further shown in FIG. 1, wheel assemblies 24 may be attached at ends of each bar 12, 14 and attachment rings 28 may be provided at opposite ends of the bars 12, 14. As described by exemplary operation below, the rings 28 may be connected to a forklift or other lifting mechanism once the assembly 10 is loaded with panels ready for installation, and the wheels 24 will assist in maneuvering the loaded assembly 10.

Figure 2:
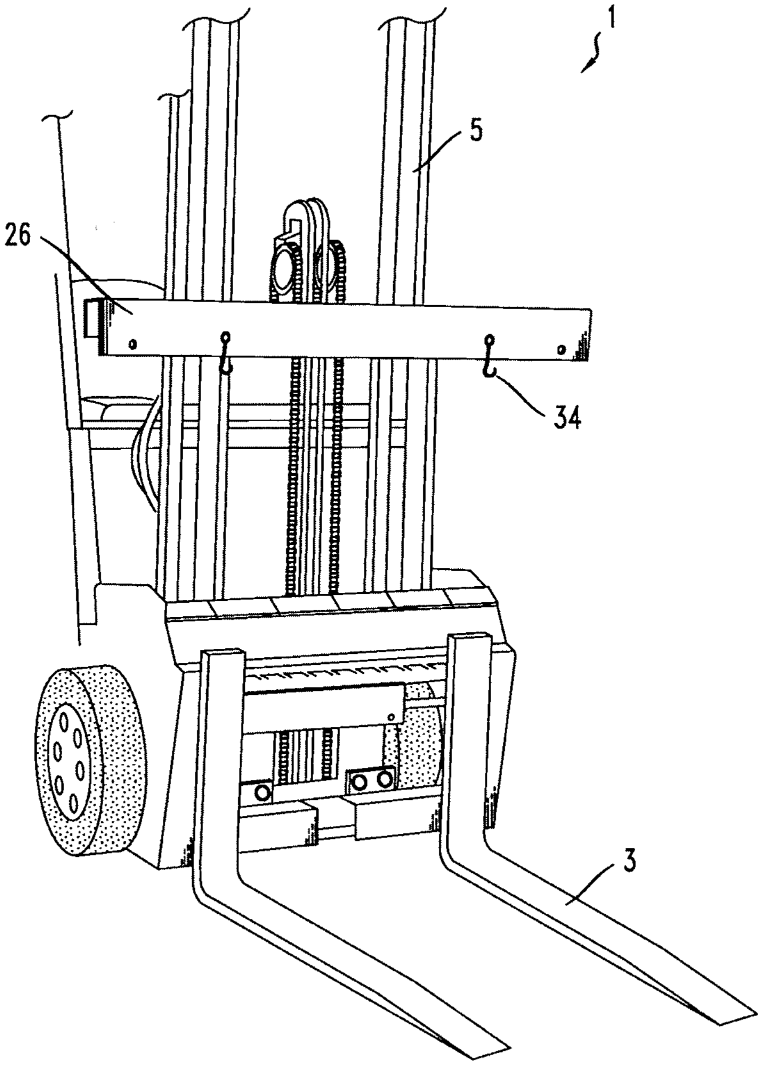
FIG. 2 is a perspective view of a component used with the embodiment as in FIG. 1, particularly showing attachment to an intended workpiece.

FIG. 2 shows an attachment bar 26 that may be connected to a lifting mechanism such as a forklift 1. The forklift 1 includes tines or forks 3 and an extension assembly or mast 5. As further shown, the attachment bar 26 may include hooks, clips, or carabiner-type mechanisms designated here as element number 34. The attachment rings 28 introduced above can be connected to the clips 34 to lower and raise the assembly 10 using the extension mast 5 of the forklift 1. The disclosure is not limited to this exemplary arrangement; for instance, the attachment rings 28 could be connected to the attachment bar 26 while the clips 34 could be attached to the bars 12, 14. Moreover, the rings 28 are not limited to the circular devices shown but could be clips or hooks complementary to the clips 34.

Figure 3:
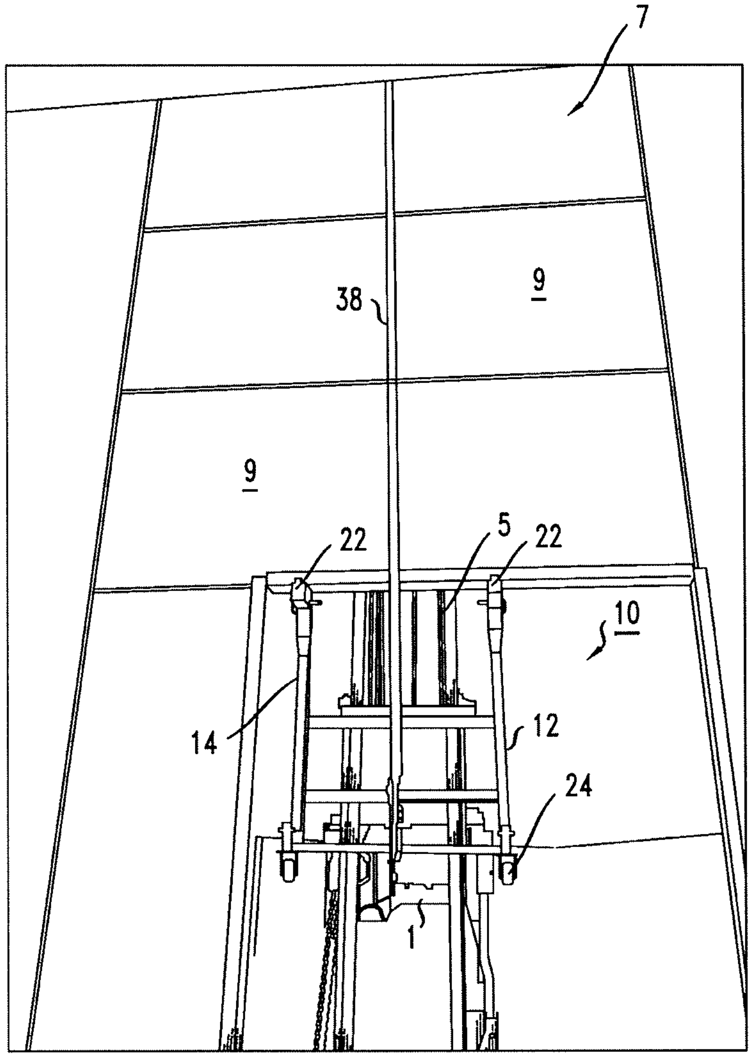
FIG. 3 is a front, perspective view of components of the embodiment as in FIG. 1, particularly showing use with the workpiece as in FIG. 2.

FIG. 3 shows the panel lift assembly 10 in exemplary operation with the forklift 1. More specifically, the assembly 10 is shown attached to the extension assembly 5 of the forklift 1 in which multiple panels 9 have been lifted into position against the bars 12, 14 carried by the cradles 22 and further secured using an optional strap or guard 38. Here, the cooler wall 7 can be seen in the background, which is formed from the panels 9. As shown, each panel 9 is about four feet (4') in height, about six feet (6') in width, and approximately six to eight inches (6-8 in.) in depth. Each panel 9 weighs approximately one hundred to one hundred and fifty pounds (100-150 lbs.). Also shown are the wheels 24 prior to lowering the elevated assembly 10.

Figure 4:
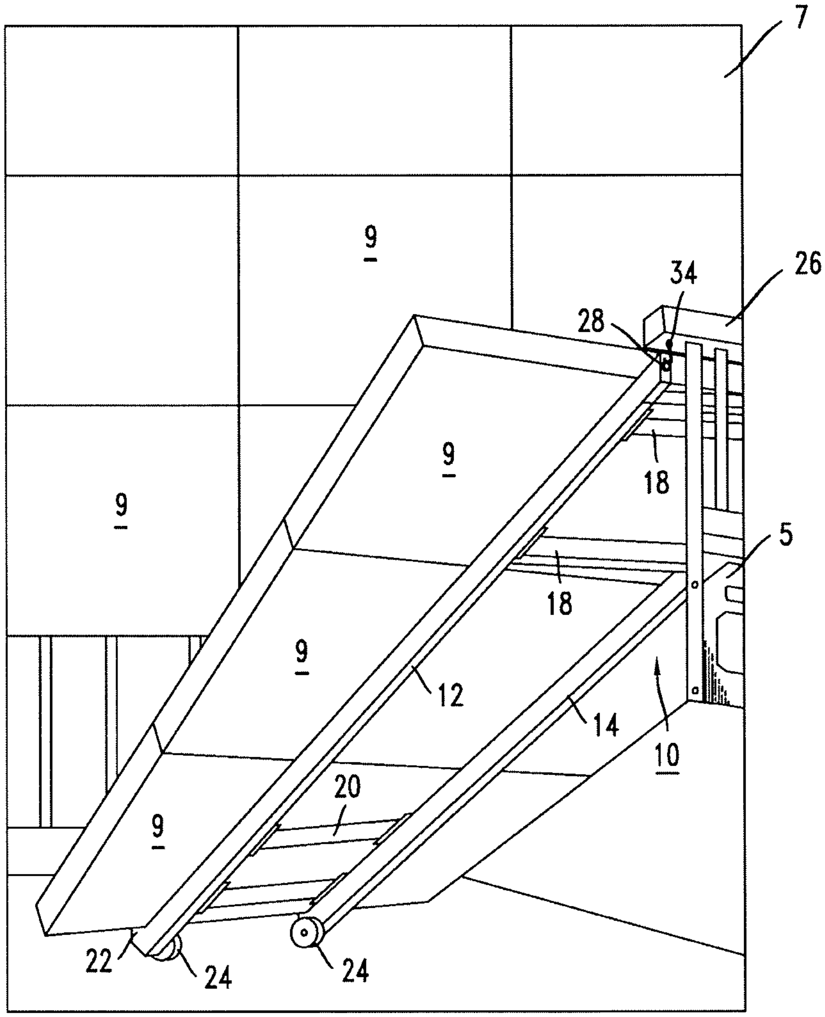
FIG. 4 is a perspective view of a step in a method of loading and installing multiple panels on the workpiece as in FIG. 2 utilizing the embodiment as in FIG. 1.

FIG. 4 shows by way of example three (3) panels 9 positioned on the assembly 10. In this example, the panels 9 are stacked on each other horizontally, but panels 9 can be vertically stacked as required for a particular task. Together, the assembled panels 9 may be approximately twenty feet (20') tall and weigh approximately four hundred pounds (400 lbs.). Here, the assembled panels 9 rest on the horizontal frames 18, 20 along the bars 12, 14. The weight of the panels 9 is nearly enough to press and hold the panels 9 together. However, cam locks or bolts (not shown) can be provided to assist in fastening the panels 9 to each other. The frames 18, 20 further serve as wings or stabilizers to prevent the panels 9 from rocking, twisting or tilting away from either of the bars 12, 14 as the forklift 1 raises the attachment bar 26 to cause the clips 34 to interact with the rings 28 as the wheels 24 roll along to elevate the cradle 10 carrying the assembled panels 9.

Although the wheel assemblies 24 in FIG. 3 show two wheels extending from the bars 12, 14, it will be appreciated that a single cylindrical roller, for instance, could be used in place of or in addition to separate wheels and/or more than two wheels could be utilized.

FIG. 4 shows the bar 12, by way of example, with the padding 16 adhered along the bar 12 as introduced above. The padding strip 16 need not be block shaped as shown, nor a single strip. The padding 16 could be provided in sections with different thicknesses at different pressure points and could be made of various materials such as rubber, polyurethane, and combinations thereof to prevent marring workpieces.

Figure 5:
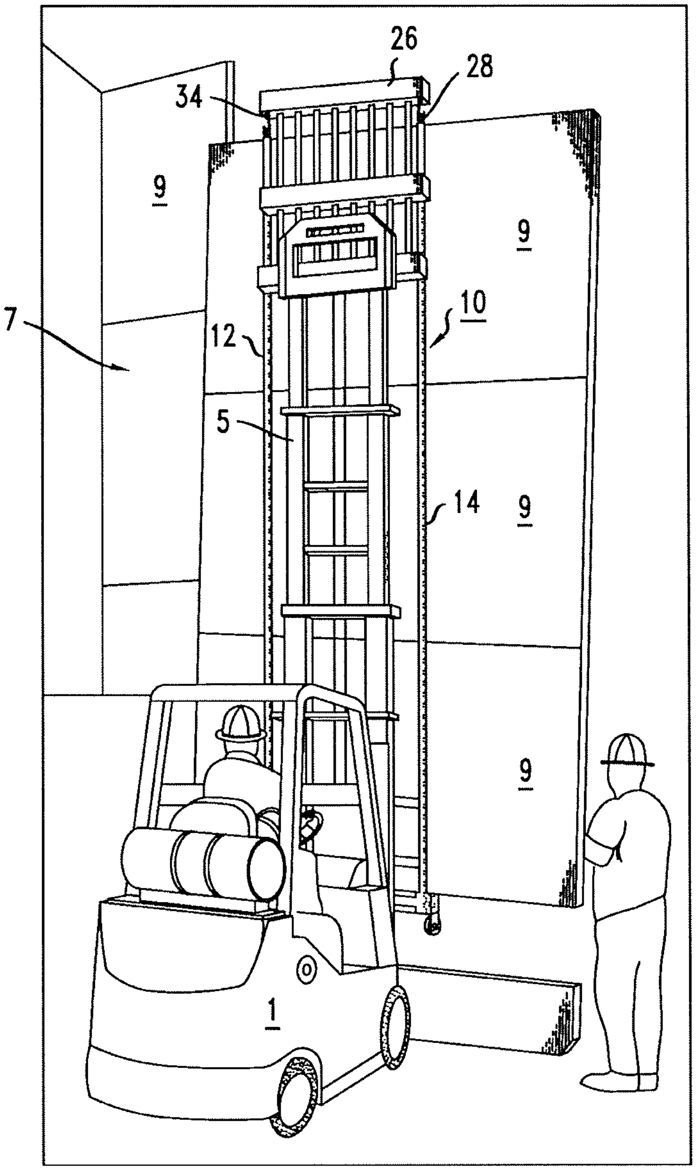
FIG. 5 is a perspective view of a further step in the method of loading and installing multiple panels as in FIG. 4 utilizing the embodiment as in FIG. 1.
Figure 6:
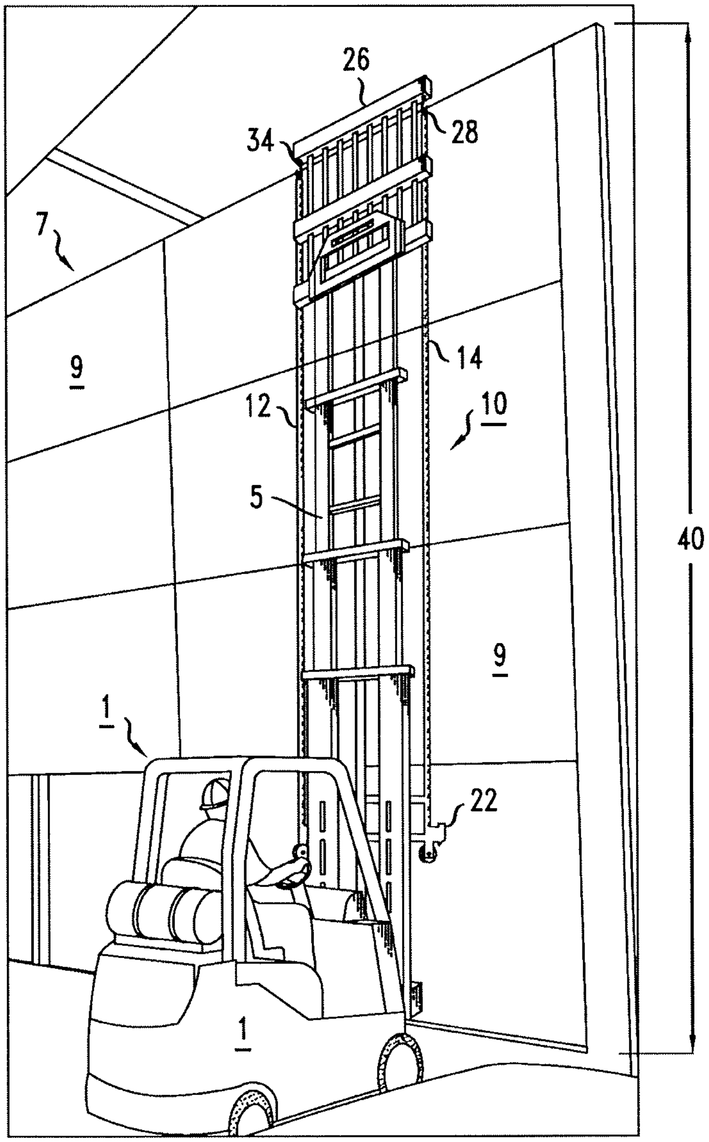
FIG. 6 is a perspective view of another step in the method of loading and installing multiple panels as in FIG. 4 utilizing the embodiment as in FIG. 1.

FIGS. 5 and 6 show multiple panels 9 being maneuvered into position next to a partially assembled cooler wall 7. The assembly 10 enables a two-man crew to bolt or otherwise safely secure the panels 9 into place in as little as 5-10 minutes, whereas conventional installation of a single panel 9 can take up to 20 minutes and 3 or 4 crewmembers. FIG. 6 most clearly shows that a height of the cooler area, designated by the number 40, may be 20-30 feet high. Therefore, those skilled in the art will appreciate the convenience and added safety of installing large, heavy panels 9 using the assembly 10 compared to having to install a single panel 9 at the top of the wall 7 and working down one panel at a time, or vice versa.

Figure 7:
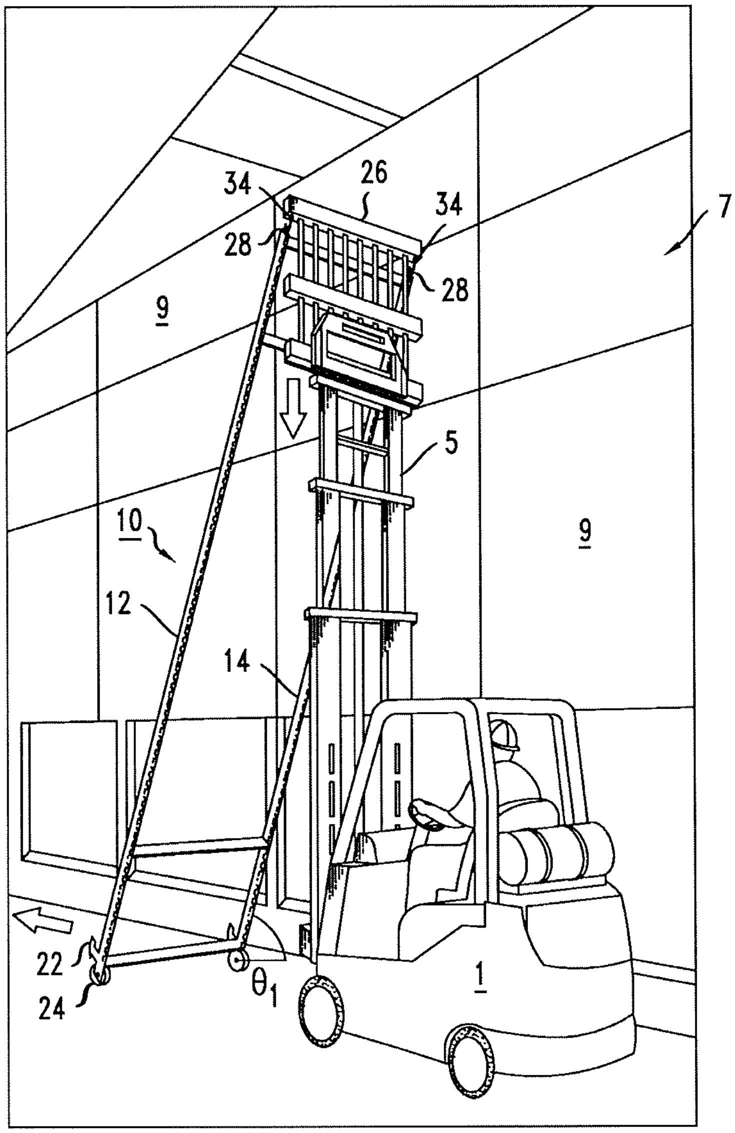
FIG. 7 is a perspective view of yet another step in the method of loading and installing multiple panels as in FIG. 4 utilizing the embodiment as in FIG. 1.
Figure 8:
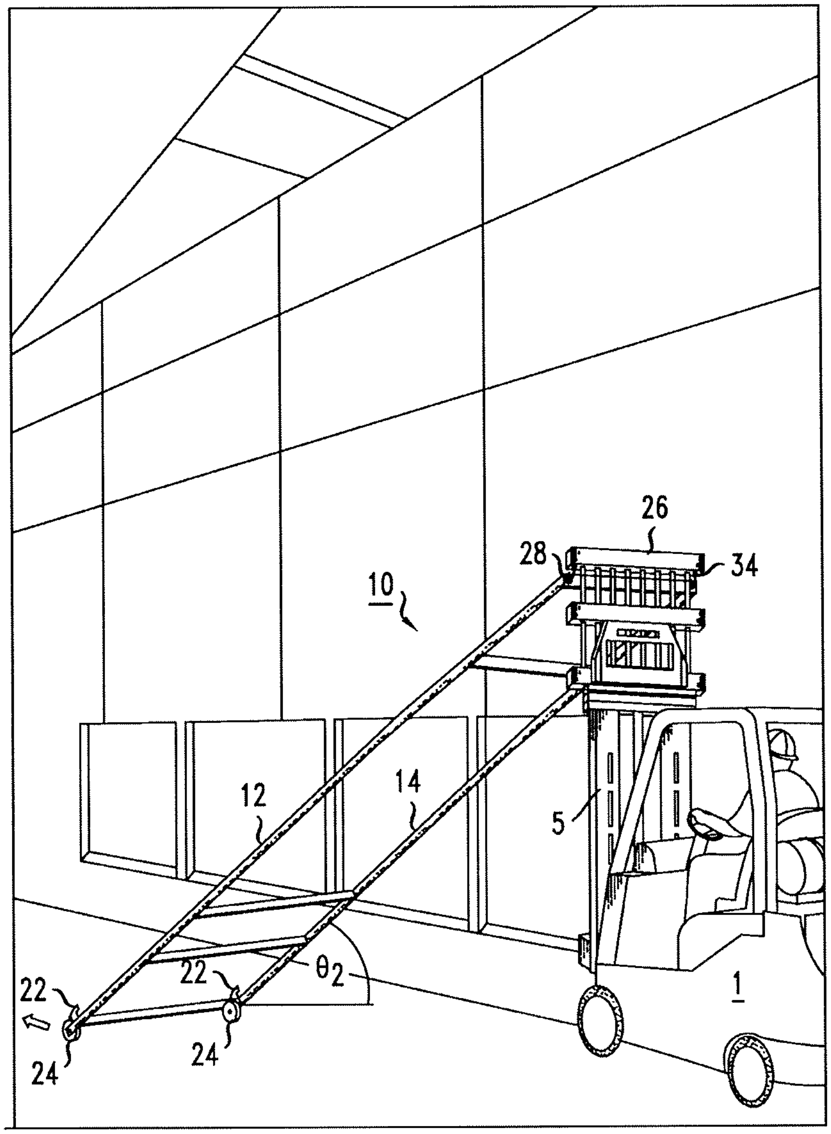
FIG. 8 is a perspective view of a further step in the method of loading and installing multiple panels as in FIG. 4 utilizing the embodiment as in FIG. 1.

In FIGS. 7 and 8 the installed panels 9 in the wall 7 can be seen in the background as the unloaded assembly 10 is shown rolling along the wheels 24 on rails 12 and 14 extending in a direction of the substantially horizontal bold arrow. At the intermediate stage shown in FIG. 7, the assembly 10 is at an angle $\Theta_1$ as the extension device 5 along with the bar 26, rings 28, and clips 34 are being lowered by the forklift 1, as indicated by the bold downwardly directed arrow. FIG. 8 shows the assembly 10 further extending in a direction of the substantially horizontal bold arrow at an angle $\Theta_2$ as the extension device 5 is further lowered. Once the assembly 10 is substantially horizontal with the floor, the assembly 10 can be loaded with another section or group of panels 9, and the process can be repeated until the cooler wall 7 is completed.

Figure 9:
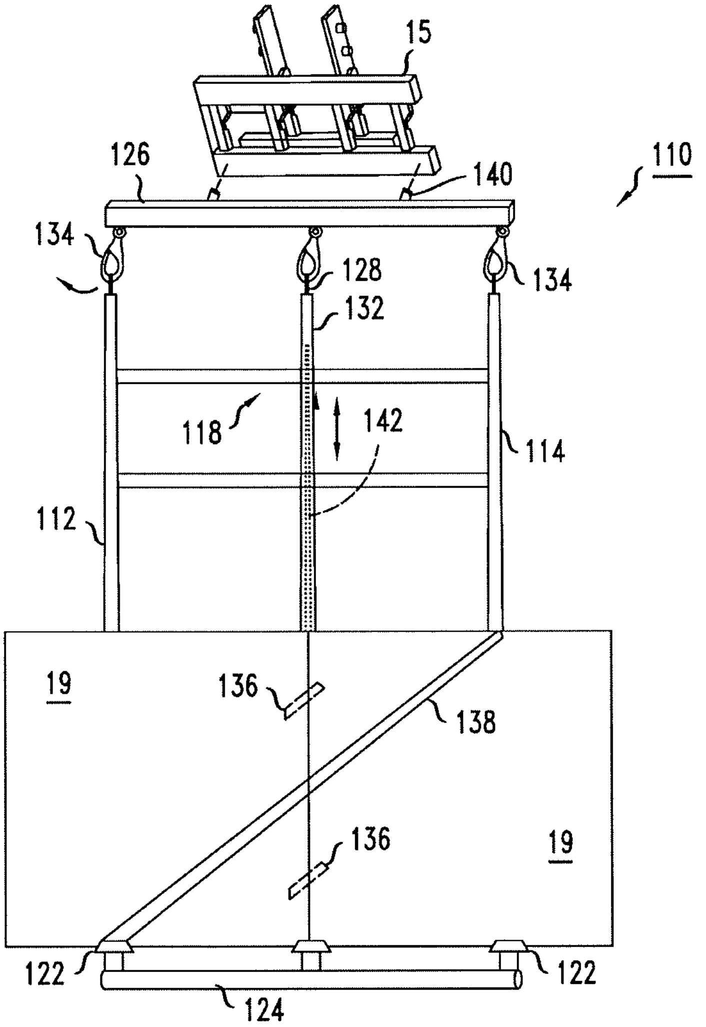
FIG. 9 is a perspective view of another embodiment of a panel installation assembly according to a further aspect of the disclosure.

Turning now to FIG. 9, according to another aspect of the disclosure, a cooler panel installation assembly, device, cradle, or jig is designated in general by the number 110. The assembly 110 broadly includes a left vertical strut or bar 112, a right vertical strut or bar 114, and a middle vertical strut or bar 132, each having horizontal rods or frames 118 attached thereto for added structural integrity to counter torsional forces when the cradle 110 is under load. The exemplary bars 112, 114, 132 may be made from metal such as steel or reinforced aluminum or other durable but preferably light-weight, strong material such as high-density polyethylene (HDPE). The bars 112, 114, 132 and therefore the assembly 110 itself may be from about four feet (4') to about twenty-five feet (25') in length and about two feet (2') to about forty feet (40') in width.

As further shown in FIG. 9, the cradle 110 may be formed with the bars 112, 114, 132, or two or more separate assemblies (such as cradle 10 introduced above) may be assembled together, either side-by-side or one above the other to accommodate extremely large sections requiring massive panel installations. Additionally, or alternatively, the bars 112, 114, 132 may be telescoping bars, as indicated by phantom internal length 142 and double-arrow, to adjust the size of the cradle 110 to accommodate smaller or larger panel assemblies as needed.

FIG. 9 further shows that the bars 112, 114, 132 may have padded ledges or arms 122 for receiving workpieces such as cooler panels 19. Here, the cooler panels 19 are arranged next to each other and held in their relative positions using interlocking mechanisms such as cam locks 136 and/or with strap assemblies 138. Additional panels 19 (not shown for clarity) can be loaded above those shown. A roller 124 or other wheel assembly is provided to assist in maneuvering the assembly 110, particularly when under load with the cooler panels 19.

Also shown in FIG. 9 is an attachment bar or arm 126 for operably connecting attachment components such as rings 128 of each bar 112, 114, 132 to a forklift or other lifting mechanism, which is partially represented here by a forklift attachment 15. As shown, the attachment bar 126 can be semi-permanently attached to the forklift attachment 15 and after each panel section 19 is off-loaded, the cradle 110 can be reloaded. Alternatively, as shown, the attachment bar 126 may include quick release mechanisms or devices 140 (such as threaded connectors, snap-fit devices, hooks, cam locks, et cetera) that can be used to release the entire assembly from the forklift attachment 15 so that the forklift can pick up a separate cradle 110 while the first, detached cradle 110 is being reloaded.

As further shown in FIG. 9, the rings or eyelets 128 can be connected to swivel hooks 134 attached to the bar 126. As the curved arrow schematically indicates, the swivels 134 permit a worker to make minor adjustments to move the panels 19 into final position for connection to a cooler wall without having to direct a forklift operator, for instance, to move the load an inch or so to the left or right, as the case may be.

Figure 10:
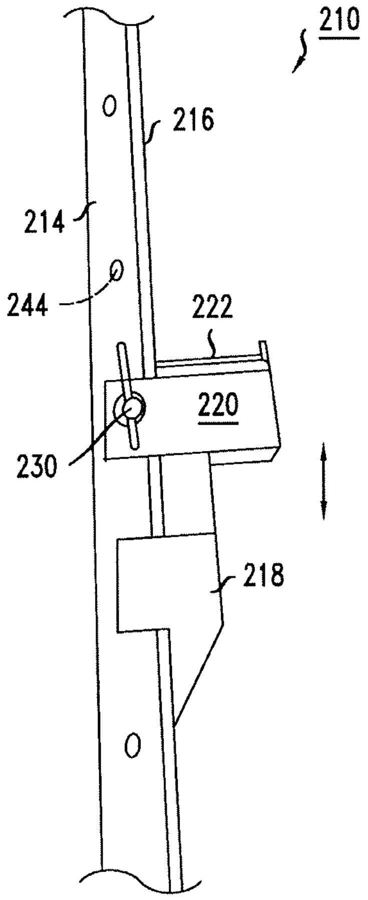
FIG. 10 is a partial perspective view of another embodiment of a panel installation assembly according to an additional aspect of the disclosure.

With reference now to FIG. 10, another embodiment of a panel carrying assembly 210 may include rails or bars such as 214 having pads or cushions 216 and an adjustable frame 218 for receiving workpieces, such as cooler panels. In this partial view, the frame 218 may include cradles or arms 220 to carry custom loads at different points along the assembly 210. More specifically, the bar 214 (and corresponding bars not shown) may have apertures 244 into which Cotter keys, bolts, or pins 230 of the frame 220 may be moved to adjust the position of the frame 220 along the bar 214, which may be necessary to accommodate different panel sizes. Here also, the arms 220 may include padding 222 to assist cushions 216 in protecting the panel load.

Figure 11:
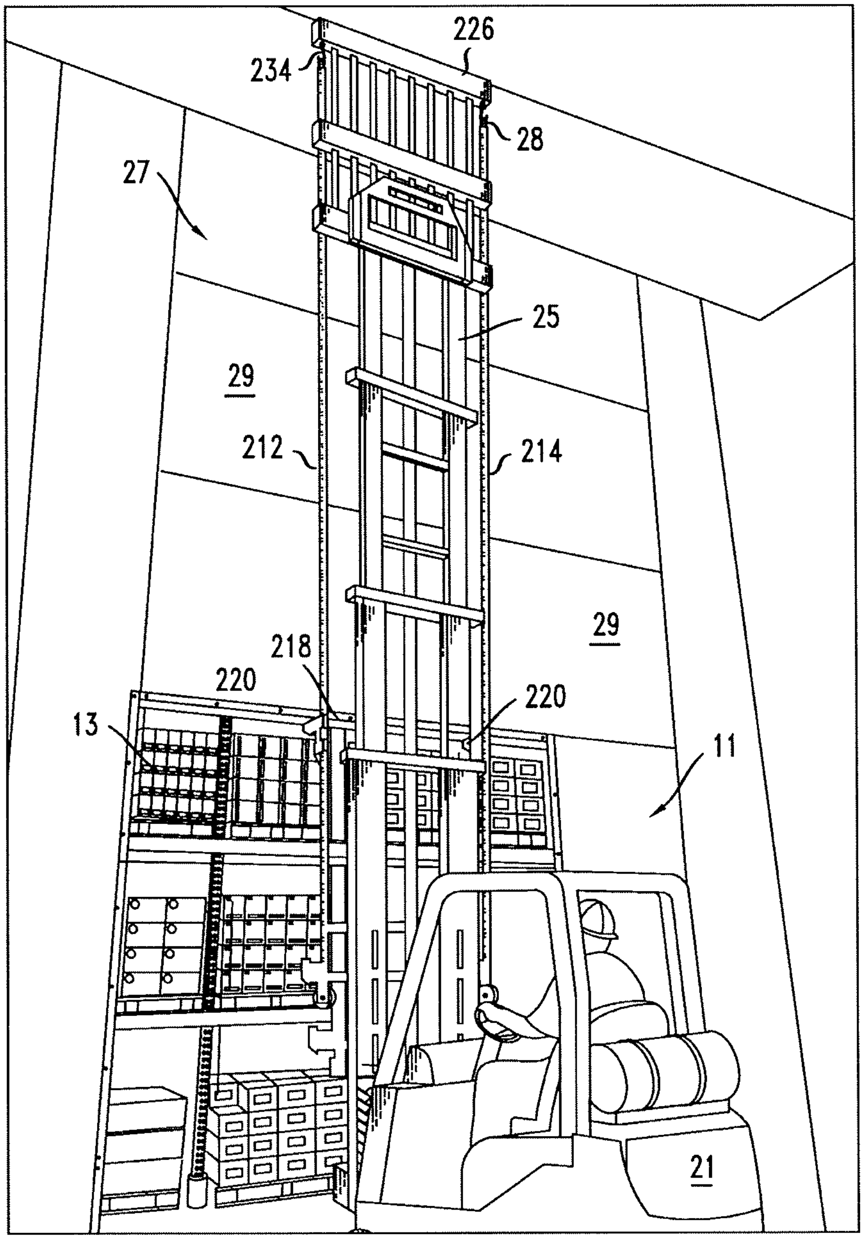
FIG. 11 is a perspective view of a step in a method of loading and installing multiple panels on a workpiece utilizing the embodiment as in FIG. 10.

FIG. 11 shows multiple panels 29 being maneuvered into position in a cooler wall 27. In this example, the frame 218 and its cradles 220 have been adjusted upwards along the rails 212, 214 to accommodate a smaller load for placement over an entryway of a cooler 11 in which refrigerated goods 13 can be seen. Here, as the forklift 21 raises the attachment bar 226, its elevator assembly 25 causes the clips 234 to interact with the rings 228 to elevate the cradle 210 carrying the assembled panels 29.

By way of example and not of limitation, exemplary embodiments of the present application could include but are not limited to:

Embodiment 1

A cooler panel lifting and installation assembly comprising a jig having a plurality of substantially vertically oriented bars spaced apart from each other; attachment means for connecting the jig to a lifting mechanism; and a roller for rolling the jig loaded with a plurality of panels in a direction of the lifting mechanism.

Embodiment 2

The assembly as in embodiment 1, wherein the bars are between about four feet to about twenty-five feet in length.

Embodiment 3

The assembly as in embodiments 1 or 2, wherein the bars are spaced apart from between about two feet to about twenty feet.

Embodiment 4

The assembly as in any of the foregoing embodiments, wherein the bars are telescoping bars.

Embodiment 5

The assembly as in any of the foregoing embodiments, wherein the attachment means is a ring attached to the jig and a bar attached to the lifting mechanism, the bar including a clip hooked to the ring, wherein when the jig is rolled in a direction of the lifting mechanism, the clip and the ring swivel relative to each other.

Embodiment 6

The assembly as in any of the foregoing embodiments, wherein the lifting mechanism is a forklift.

Embodiment 7

The assembly as in any of the foregoing embodiments, further comprising a substantially horizontally oriented frame configured to stabilize the panels as the lifting mechanism elevates the panels.

Embodiment 8

A method of loading, elevating and installing a section of cooler panels, the method comprising providing a jig having a plurality of substantially vertically oriented bars spaced apart from each other and a substantially horizontally oriented frame configured to stabilize a load of panels; attaching a swivable bar to the jig and to a lifting mechanism; loading a plurality of cooler panels on the jig; rolling the jig loaded with the plurality of panels in a direction of the lifting mechanism; raising the panels into position on a cooler wall; and installing the panels as a unitary panel section in the cooler wall.

Embodiment 9

A cooler panel lifting and installation assembly, the assembly comprising a jig having a plurality of substantially vertically oriented bars spaced apart from each other and cradles depending from the jig for receiving workpieces; attachment means for connecting the jig to a lifting mechanism; and a roller connectable to the jig for rolling the jig loaded with a plurality of workpieces in a direction of the lifting mechanism.

Embodiment 10

The assembly as in embodiment 9, wherein the bars are between about four feet to about twenty-five feet in length.

Embodiment 11

The assembly as in embodiments 9 or 10, wherein the bars are spaced apart from between about two feet to about twenty feet.

Embodiment 12

The assembly as in embodiments 9, 10 or 11, wherein the cradles are adjustable along the bars to accommodate a variety of workpieces.

Embodiment 13

The assembly as in any of the embodiments 9 through 12, wherein the attachment means is a ring attached to the jig and a bar attached to the lifting mechanism, the bar including a clip attachable to the ring, wherein when the jig is rolled in a direction of the lifting mechanism, the clip and the ring swivel relative to each other.

Embodiment 14

The assembly as in any of the embodiments 9 through 13, wherein the lifting mechanism is a forklift.

Embodiment 15

The assembly as in any of the embodiments 9 through 14, further comprising a substantially horizontally oriented frame configured to stabilize the workpieces as the lifting mechanism elevates the panels.

Embodiment 16

The assembly as in any of the embodiments 9 through 15, wherein the cradle is attached to the substantially horizontally oriented frame.

Embodiment 17

The assembly as in any of the embodiments 9 through 16, wherein the workpieces are cooler panels.

Embodiment 18

A cooler panel lifting and installation assembly, the assembly comprising a jig having a plurality of substantially vertically oriented bars spaced apart from each other, a ring attached to the jig, and cradles depending from the jig for receiving workpieces; a roller connectable to the jig for rolling the jig loaded with a plurality of workpieces in a direction of a lifting mechanism; and a bar attached to the lifting mechanism, the bar including a clip attachable to the ring, wherein when the jig is rolled in a direction toward the lifting mechanism, the clip and the ring swivel relative to each other to raise the jig, and when the jig is rolled in a direction away from the lifting mechanism, the clip and the ring swivel relative to each other to lower the jig.

Embodiment 19

The assembly as in embodiment 18, wherein the cradles are adjustable along the bars to accommodate a variety of workpieces.

Embodiment 20

The assembly as in embodiments 18 or 19, wherein the cradles are padded to cushion workpieces.

Embodiment 21

The assembly as in any of the embodiments 18, 19, or 20, further comprising a substantially horizontally oriented frame configured to stabilize the workpieces as the lifting mechanism elevates the panels.

Embodiment 22

The assembly as in any of the embodiments 18 through 21, wherein the workpieces are cooler panels.

Embodiment 23

The assembly as in any of the embodiments 18 through 22, further comprising a quick release mechanism to detach the bar from the lifting mechanism, and therefore the jig, when empty, for replacement with another bar and a loaded jig.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A cooler panel lifting and installation assembly, the assembly comprising:

a first jig having a plurality of substantially vertically oriented bars spaced apart from each other and cradles depending from the first jig for receiving workpieces;

wherein the plurality of substantially vertically oriented bars are configured to have at least one adjustable length to increase or decrease a length of the plurality of substantially vertically oriented bars to accommodate various sized workpieces;

attachment means for connecting the first jig to a lifting mechanism;

a roller connectable to the first jig for rolling the first jig loaded with a plurality of workpieces in a direction of the lifting mechanism; and wherein the first jig is configured to attach to a second jig either vertically or horizontally to form a combined jig.

2. The assembly as in claim 1, wherein the bars are between about four feet to about twenty-five feet in length.

3. The assembly as in claim 1, wherein the bars are spaced apart from between about two feet to about twenty feet.

4. The assembly as in claim 1, wherein the cradles are adjustable along the bars to accommodate a variety of workpieces.

5. The assembly as in claim 1, wherein the attachment means is a ring attached to the first jig and a bar attached to the lifting mechanism, the bar including a clip attachable to the ring, wherein when the first jig is rolled in a direction of the lifting mechanism, the clip and the ring swivel relative to each other.

6. The assembly as in claim 1, wherein the lifting mechanism is a forklift.

7. The assembly as in claim 1, further comprising a substantially horizontally oriented frame configured to stabilize the workpieces as the lifting mechanism elevates the panels.

8. The assembly as in claim 7, wherein the cradle is attached to the substantially horizontally oriented frame.

9. The assembly as in claim 1, wherein the workpieces are cooler panels.

10. A method of loading, elevating and installing a section of cooler panels, the method comprising:

providing a first jig having a plurality of substantially vertically oriented bars spaced apart from each other and a substantially horizontally oriented frame configured to stabilize a load of panels;

configuring the plurality of substantially vertically oriented bars to have at least one adjustable length to increase or decrease a length of the plurality of substantially vertically oriented bars to accommodate various sized workpieces;

configuring the substantially horizontally oriented frame to have at least one adjustable length to increase or decrease a length of the substantially horizontally oriented frame;

attaching a swivable bar to the first jig and to a lifting mechanism;

loading a plurality of cooler panels on the first jig;

rolling the first jig loaded with the plurality of panels in a direction of the lifting mechanism;

raising the panels into position on a cooler wall;

installing the panels as a unitary panel section in the cooler wall; and wherein the first jig is configured to attach to a second jig either vertically or horizontally to form a combined jig.

11. A cooler panel lifting and installation assembly, the assembly comprising:

a first jig having a plurality of substantially vertically oriented bars spaced apart from each other, a ring attached to the first jig, and cradles depending from the first jig for receiving workpieces;

wherein the plurality of substantially vertically oriented bars are configured to have at least one adjustable length to increase or decrease a length of the plurality of substantially vertically oriented bars to accommodate various sized workpieces;

a roller connectable to the first jig for rolling the first jig loaded with a plurality of workpieces in a direction of a lifting mechanism;

a bar attached to the lifting mechanism, the bar including a clip attachable to the ring, wherein when the first jig is rolled in a direction toward the lifting mechanism, the clip and the ring swivel relative to each other to raise the first jig, and when the first jig is rolled in a direction away from the lifting mechanism, the clip and the ring swivel relative to each other to lower the first jig; and wherein the first jig is configured to attach to a second jig either vertically or horizontally to form a combined jig.

12. The assembly as in claim 11, wherein the cradles are adjustable along the bars to accommodate a variety of workpieces.

13. The assembly as in claim 11, wherein the cradles are padded to cushion workpieces.

14. The assembly as in claim 11, further comprising a substantially horizontally oriented frame configured to stabilize the workpieces as the lifting mechanism elevates the panels.

15. The assembly as in claim 11, wherein the workpieces are cooler panels.

16. The assembly as in claim 11, further comprising a quick release mechanism to detach the bar from the lifting mechanism, and therefore the first jig, when empty, for replacement with another bar and a loaded jig.

* * * * *